(12) United States Patent
Malladi (10) Patent No.: US 8,169,956 B2
(45) Date of Patent: May 1, 2012

(54) MAPPING UPLINK ACKNOWLEDGEMENT TRANSMISSION BASED ON DOWNLINK VIRTUAL RESOURCE BLOCKS

(75) Inventor: Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 925 days.

(21) Appl. No.: 12/019,909

(22) Filed: Jan. 25, 2008

(65) Prior Publication Data

US 2008/0205348 A1 Aug. 28, 2008

Related U.S. Application Data

(60) Provisional application No. 60/886,889, filed on Jan. 26, 2007, provisional application No. 60/888,233, filed on Feb. 5, 2007.

(51) Int. Cl.
*H04W 28/00* (2009.01)

(52) U.S. Cl. ........................ 370/329; 370/236; 370/395.4

(58) Field of Classification Search .................. 370/235, 370/236, 328, 329, 335, 395.4, 468
See application file for complete search history.

(56) References Cited

U.S. PATENT DOCUMENTS

| | | | |
|---|---|---|---|
| 7,701,912 B2 * | 4/2010 | Thompson et al. | 370/338 |
| 2002/0036985 A1 | 3/2002 | Jonas et al. | |
| 2005/0066336 A1 * | 3/2005 | Kavoori et al. | 719/321 |
| 2006/0280119 A1 * | 12/2006 | Karamanolis et al. | 370/229 |
| 2007/0041311 A1 * | 2/2007 | Baum et al. | 370/208 |
| 2007/0053320 A1 * | 3/2007 | Rinne et al. | 370/329 |
| 2007/0082696 A1 * | 4/2007 | Wang | 455/550.1 |
| 2007/0097981 A1 * | 5/2007 | Papasakellariou | 370/394 |
| 2007/0171849 A1 | 7/2007 | Zhang et al. | |
| 2007/0189197 A1 * | 8/2007 | Kwon et al. | 370/319 |
| 2008/0022284 A1 * | 1/2008 | Cherkasova et al. | 718/104 |

FOREIGN PATENT DOCUMENTS

| | | |
|---|---|---|
| EP | 1392074 A2 | 2/2004 |
| EP | 1677477 A1 | 7/2006 |
| GB | 2439367 | 12/2007 |
| RU | 2262196 | 2/2005 |
| RU | 2282310 C2 | 8/2006 |
| WO | WO2004038990 A1 | 5/2004 |
| WO | WO 2005002252 | 1/2005 |
| WO | WO2005020473 A1 | 3/2005 |
| WO | WO2005078967 A1 | 8/2005 |
| WO | WO2005109725 | 11/2005 |

(Continued)

OTHER PUBLICATIONS

International Search Report—PCT/US2008/052218, International Search Authority—European Patent Office—Jul. 31, 2008.

(Continued)

*Primary Examiner* — Brian Nguyen
(74) *Attorney, Agent, or Firm* — Darrell Scott Juneau; Peng Zhu (57) ABSTRACT

An acknowledgment (ACK) mapping automation that reduces overhead for a wireless communication systems such as UTRAN-LTE, Global System for Mobile communications (GSM: originally from Groupe Spécial Mobile), High-Speed Downlink Packet Access (HSDPA), or any packet-switched system, by providing a mapping of uplink (UL) location (i.e., modulation location in time, frequency and code) based upon a downlink (DL) allocations. Aspects address dynamic and persistent scheduling of user equipment (EU) with a selected combination of implicit and explicit mapping.

44 Claims, 7 Drawing Sheets

FOREIGN PATENT DOCUMENTS

| WO | WO2006088301 A1 | 8/2006 |
| WO | WO2006130742 | 12/2006 |
| WO | WO2008036977 | 3/2008 |
| WO | WO2008085000 A1 | 7/2008 |

OTHER PUBLICATIONS

European Search Report—EP11175872—Search Authority—Munich—Aug. 11, 2011.

Huawei: "ACK/NACK repetition in E-UTUA uplink" 3GPP Draft; R1-080121, 3rd Generation Partnership Project (3GPP), Mobile Competence Centre ; 650, Route Des Lucioles ; F-06921 Sophia-Antipolis Cedex; France, vol. RAN WG1, no. Sevilla, Spain; 20080108, Jan. 8, 2008, XP050108652.

Partial European Search Report—EP11152259—Search Authority—Munich—Jun. 30, 2011.

Qualcomm Europe: "Mapping of UL ACK Transmission based on DL VRB", 3GPP Draft; R1-070660, 3rd Generation Partnership Project (3GPP), Mobile Competence Centre; 650, Route Des Lucioles; F-06921 Sophia-Antipolis Cedex; France, vol. RAN WG1, no. St. Louis, USA; 20070206, Feb. 6, 2007, XP050104696 [retrieved on Feb. 6, 2007].

Qualcomm Europe: "PHY channel structure and multiplexing", 3GPP Draft; R1-062685, 3rd Generation Partnership Project (3GPP), Mobile Competence Centre ; 650, Route Des Lucioles ; F-06921 Sophia-Antipolis Ceoex ; France, vol . RAN WG1, no. Seoul , Korea; 20061004, Oct. 4, 2006, XP050103174, [retrieved on Oct. 4, 2006].

Qualcomm Europe: "Proposed Structure for UL ACK and CQI" 3GPP Draft; RI-070437, 3rd Generation Partnership Project (3GPP), Mobile Competence Centre ; 650, Route Des Lucioles ; F-06921 Sophia-Antipolis Cedex; France, vol. RAN WG1, no. Sorrento, Italy; 20070110, Jan. 10, 2007 XP050104468 [retrieved on Jan. 10, 2007] the whole document.

Samsung et al: "UL ACK/NACK resource indication for DL persistent scheduling", 3GPP Draft; R1-080681 UL Persistent Acknack Indication and Use, 3rd Generation Partnership Project (3GPP), Mobile Competence Centre; 650, Route Des Lucioles; F-06921 Sophia-Antipolis Cedex; France, vol. RAN WG1, no. Sorrento, Italy; 20080205, Feb. 5, 2008, XP050109177, [Retrieved on Feb. 5, 2008].

Written Opinion—PCT/US2008/052218, International Search Authority, European Patent Office, Jul. 31, 2008.

* cited by examiner

MAPPING UPLINK ACKNOWLEDGEMENT TRANSMISSION BASED ON DOWNLINK VIRTUAL RESOURCE BLOCKS

CLAIM OF PRIORITY UNDER 35 U.S.C. §119

The present Application for Patent claims priority to Provisional Application No. 60/886,889 entitled "Reduced ACK Overhead for Orthogonal Systems" filed Jan. 26, 2007, and to Provisional Application No. 60/888,233 entitled "Mapping of UL ACK Transmission Based Upon DL VRBS" filed Feb. 5, 2007, and both assigned to the assignee hereof and hereby expressly incorporated by reference herein.

FIELD OF INVENTION

The exemplary and non-limiting aspects described herein relate generally to wireless communications systems, methods, computer program products and devices, and more specifically to techniques for achieving uplink frequency, time and code synchronization of user equipment.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems: include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single out or a multiple-in-multiple-out (MIMO) system.

Universal Mobile Telecommunications System (UMTS) is one of the third-generation (3G) cell phone technologies. UTRAN, short for UMTS Terrestrial Radio Access Network, is a collective term for the Node-B's and Radio Network Controllers which make up the UMTS radio access network. This communications network can carry many traffic types from real-time Circuit Switched to IP based Packet Switched. The UTRAN allows connectivity between the UE (user equipment) and the core network. The UTRAN contains the base stations, which are called Node Bs, and Radio Network Controllers (RNC). The RNC provides control functionalities for one or more Node Bs. A Node B and an RNC can be the same device, although typical implementations have a separate RNC located in a central office serving multiple Node B's. Despite the fact that they do not have to be physically separated, there is a logical interface between them known as the Iub. The RNC and its corresponding Node Bs are called the Radio Network Subsystem (RNS). There can be more than one RNS present in an UTRAN.

3GPP LTE (Long Term Evolution) is the name given to a project within the Third Generation Partnership Project (3GPP) to improve the UMTS mobile phone standard to cope with future requirements. Goals include improving efficiency, lowering costs, improving services, making use of new spectrum opportunities, and better integration with other open standards. The LTE project is not a standard, but it will result in the new evolved release 8 of the UMTS standard, including mostly or wholly extensions and modifications of the UMTS system.

In most orthogonal systems with Automatic Repeat (ARQ), the uplink (UL) acknowledgement (ACK) is implicitly mapped on corresponding time/frequency/code resources depending on the downlink (DL) packet location in time/freq/code. The one-to-one mapping is usually linked to each minimum allocation of virtual resource block (VRB), with each packet containing multiple VRBs. This implies that for each packet, a user equipment (UE) has several instances of ACKs available for transmission (reserved resources), one corresponding to each VRB contained within the packet. This may lead to large overheads, especially when the packets span multiple VRBs. For instance, with one cyclic shift in pre-assigned UL physical resource block (PRB) per DL VRB. Considering Six ACKs per UL PRB, an overhead on the DL can be shown to be 16.66%.

It has been suggested that one cyclic shift and resource block combination can be implicitly mapped per physical downlink control channel (PDCCH). Thus, the UL overhead would be dictated by the number of DL assignments, which would entail 16.66% for 1.25 MHz and 4% for larger bandwidths, assuming (4, 8, 16) DL PDCCH for (5, 10, 20) MHz. However, this approach suggests that each packet has to be scheduled, shifting overhead from the UL to the DL. This approach would not be appropriate for control-less operation. Every Voice Over IP (VoIP) packet would be scheduled by the PDCCH in a unicast manner Should the PDCCH be addressed to multiple users by bitmap (i.e., group PDCCH) for VoIP, this approach would not work. This approach does not work for persistent assignments, at least it is believed not without cumbersome modifications.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with mapping of a downlink (DL) allocation to an uplink (UL) location for acknowledgement (ACK). In particular, the approach reduces overhead while being adaptable to situations in which certain user equipment (i.e., access terminals) are being persistently scheduled whereas others are being dynamically scheduled within a packet-switch system.

In one aspect, a method is provided for mapping a user equipment (UE) uplink (UL) acknowledgement (ACK) location based upon a downlink (DL) resource allocation in a wireless data packet communication system. The UE is dynamically scheduled by a resource allocation of at least one DL virtual resource block (VRB). In response, a UL ACK Identifier (ID) is received that is implicitly mapped to a corresponding cyclically shifted sequence for a dynamically scheduled UE.

In another aspect, at least one processor is configured to map a user equipment (UE) uplink (UL) acknowledgement (ACK) location based upon a downlink (DL) resource allocation in a wireless data packet communication system. A first module dynamically schedules the UE by a resource allocation of at least one DL virtual resource block (VRB). A second module receives a UL ACK Identifier (ID) implicitly mapped to a corresponding cyclically shifted sequence for a dynamically scheduled UE.

In an additional aspect, a computer program product has computer-readable medium for mapping a user equipment (UE) uplink (UL) acknowledgement (ACK) location based upon a downlink (DL) resource allocation in a wireless data packet communication system. A first set of codes causes a computer to dynamically schedule the UE by a resource allocation of at least one DL virtual resource block (VRB). A second set of codes causes the computer to receive a UL ACK Identifier (ID) implicitly mapped to a corresponding cyclically shifted sequence for a dynamically scheduled UE.

In yet a further aspect, an apparatus maps a user equipment (UE) uplink (UL) acknowledgement (ACK) location based upon a downlink (DL) resource allocation in a wireless data packet communication system. A means dynamically schedules the UE by a resource allocation of at least one DL virtual resource block (VRB). Another means receives a UL ACK Identifier (ID) implicitly mapped to a corresponding cyclically shifted sequence for a dynamically scheduled UE.

In yet another aspect, an apparatus maps a user equipment (UE) uplink (UL) acknowledgement (ACK) location based upon a downlink (DL) resource allocation in a wireless data packet communication system. A scheduling component dynamically schedules the UE by a resource allocation of at least one DL virtual resource block (VRB). A receiving component receives a UL ACK Identifier (ID) implicitly mapped to a corresponding cyclically shifted sequence for a dynamically scheduled UE.

In another aspect, a method provides for a user equipment (UE) to interpret mapping of uplink (UL) acknowledgement (ACK) location based upon a downlink (DL) resource allocation from an access node in a wireless data packet communication system. The UE receives dynamically scheduling by a resource allocation of at least one DL virtual resource block (VRB) from the access node. In response, the dynamically scheduled UE sends a UL ACK Identifier (ID) implicitly mapped to a corresponding cyclically shifted sequence.

In an additional aspect, at least one processor for a user equipment (UE) interprets mapping of uplink (UL) acknowledgement (ACK) location based upon a downlink (DL) resource allocation from an access node in a wireless data packet communication system. A first module receives dynamically scheduling by a resource allocation of at least one DL virtual resource block (VRB) from an access node. A second module sends a UL ACK Identifier (ID) implicitly mapped to a corresponding cyclically shifted sequence for the dynamically scheduled UE.

In yet another aspect, a computer program product has computer readable medium for causing a user equipment (UE) to interpret mapping of uplink (UL) acknowledgement (ACK) location based upon a downlink (DL) resource allocation from an access node in a wireless data packet communication system. A first set of codes causes a computer to receive dynamically scheduling of the UE by a resource allocation of at least one DL virtual resource block (VRB) from an access node. A second set of codes causes the computer to send a UL ACK Identifier (ID) implicitly mapped to a corresponding cyclically shifted sequence for a dynamically scheduled UE.

In yet an additional aspect, an apparatus is provided for a user equipment (UE) to interpret mapping of uplink (UL) acknowledgement (ACK) location based upon a downlink (DL) resource allocation from an access node in a wireless data packet communication system. A means receives dynamically scheduling by a resource allocation of at least one DL virtual resource block (VRB) from an access node. Another means sends a UL ACK Identifier (ID) implicitly mapped to a corresponding cyclically shifted sequence for the dynamically scheduled UE.

In yet a further aspect, an apparatus is provided for a user equipment (UE) to interpret mapping of uplink (UL) acknowledgement (ACK) location based upon a downlink (DL) resource allocation from an access node in a wireless data packet communication system. A mapping component receives dynamic scheduling by a resource allocation of at least one DL virtual resource block (VRB) from an access node. A transmitting component sends a UL ACK Identifier (ID) implicitly mapped to a corresponding cyclically shifted sequence for the dynamically scheduled UE.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

An acknowledgment (ACK) mapping automation that reduces overhead for a wireless communication systems such as UTRAN-LTE, Global System for Mobile communications (GSM: originally from Groupe Special Mobile), High-Speed Downlink Packet Access (HSDPA), or any packet-switched system, by providing a mapping of uplink (UL) location (i.e., modulation location in time, frequency, and code) based upon a downlink (DL) allocations. Aspects address dynamic and persistent scheduling of user equipment (EU) with a selected combination of implicit and explicit mapping.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Figure 1:
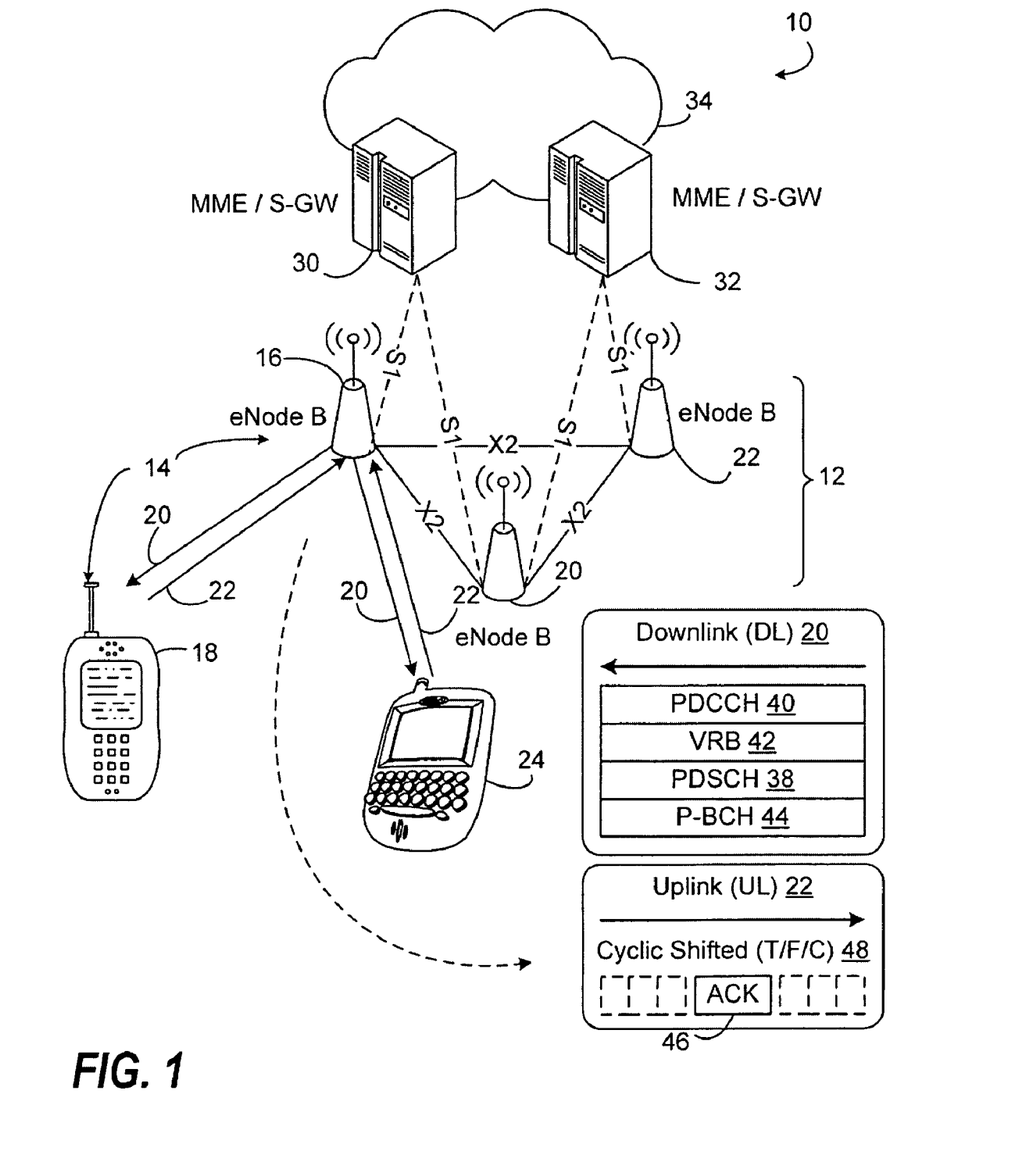
FIG. 1 illustrates a block diagram of a communication system employing a reduced overhead to map downlink (DL) resource allocations to uplink (UL) acknowledgement (ACK) locations for both dynamically and persistently scheduled user equipment (UE)

Referring initially to FIG. 1, in one aspect, a communication system 10 includes an evolved Universal Mobile Telecommunications System (UMTS) Terrestrial Radio Access Network (E-UTRAN) 12 that incorporates an ACK mapping automation 14 between at last one radio access network (RAN), depicted as an evolved base node (eNode B) 16 and a user equipment (UE) device 18. In the illustrative version, the UE device 18 is being dynamically scheduled via downlink (DL) 20 for communication on an uplink (UL) 22. The eNode B 16 is also in communication with a UE device 24 that is being persistently scheduled. The E-TRAN 12 also includes eNode Bs 26, 28.

The eNode Bs 16, 26, 28 provide an UMTS Terrestrial Radio Access (E-UTRA) user plane and control plane (RRC) protocol terminations towards the UEs 18, 24. The user plane can comprise of 3GPP (3rd Generation Partnership Project) Packet Data Convergence Protocol (PDCP), radio link control (RLC), medium access control (MAC) and physical layer control (PHY). The eNode Bs 16, 26, 28 are interconnected with each other by means of X2 interface ("X2"). The eNode Bs 16, 26, 28 are also connected by means of an S1 interface ("S1") to an EPC (Evolved Packet Core), more specifically to mobility management entities/serving gateways (MME/S-GW) 30, 32 connected to a data packet network 34. The S1 interface supports a many-to-many relation between MMEs/S-GW 26, 28 and eNode Bs 16, 26, 28.

The eNode Bs 16, 26, 28 host the following functions: radio resource management: radio bearer control, radio admission control, connection mobility control, dynamic allocation of resources to UEs in both uplink and downlink (scheduling); IP header compression and encryption of user data stream; selection of an MME at UE attachment; routing of user plane data towards serving gateway; scheduling and transmission of paging messages (originated from the MME); scheduling and transmission of broadcast information; and measurement and measurement reporting configuration for mobility and scheduling.

The MME hosts the following functions: distribution of paging messages to the eNodes Bs 16, 26, 28; security control; idle state mobility control; System Architecture Evolution (SAE) bearer control; ciphering and integrity protection of Non-Access Stratum (NAS) signaling. The Serving Gateway hosts the following functions termination of U-plane packets for paging reasons and switching of U-plane for support of UE mobility.

The DL 20 from the eNode B 16 includes a plurality of communication channels relevant to download allocation that should be mapped to uplink location(s) for ACK discussed below, including a Physical Downlink Shared Channel (PDSCH) 38, Physical Downlink Control Channel (PDCCH) 40, virtual resource block (VRB) 42, and physical broadcast channel (P-BCH) 44.

Three different types of physical (PHY) channels are defined for the LTE downlink 20. One common characteristic of physical channels is that they all convey information from higher layers in the LTE stack. This is in contrast to physical signals, which convey information that is used exclusively within the PHY layer.

LTE DL physical channels are Physical Downlink Shared Channel (PDSCH) 38, Physical Downlink Control Channel (PDCCH) 40, and Common Control Physical Channel (CCPCH) (not shown). Physical channels 38, 40 map to transport channels, which are service access points (SAPs) for the L2/L3 layers. Each physical channel has defined algorithms for bit scrambling, modulation, layer mapping, cyclic delay diversity (CDD) preceding, resource element assignment; layer mapping and pre-coding are related to MIMO applications. A layer corresponds to a spatial multiplexing channel.

A Broadcast Channel (BCH) 44 has a fixed format and is broadcast over an entire coverage area of a cell. A Downlink Shared Channel (DL-SCH) supports Hybrid ARQ (HARD), supports dynamic link adaption by varying modulation, coding and transmit power, is suitable for transmission over entire cell coverage area, is suitable for use with beamforming, supports dynamic and semi-static resource allocation, and supports discontinuous receive (DRX) for power save. A Paging Channel (PCH) supports UE DRX, requires broadcast over entire cell coverage area, and is mapped to dynamically allocated physical resources. A Multicast Channel (MCH) is required for broadcast over entire cell coverage area, supports Multicast/broadcast-single frequency network (MB-SFN), supports semi-static resource allocation. Supported transport channels are Broadcast channel (BCH), Paging channel (PCH), Downlink shared channel (DL-SCH), and Multicast channel (MCH). Transport channels provide the following functions: structure for passing data to/from higher layers, a mechanism by which higher layers can configure the PHY status indicators (packet error, CQI etc.) to higher layers, and support for higher-layer peer-to-peer signaling. Transport channels are mapped to physical channels as follows: BCH maps to CCPCH, although mapping to PDSCH under consideration. PCH and DL-SCH maps to PDSCH. MCH may be mapped to PDSCH.

The source allocations indicated on the DL 20 are mapped to the UL 22, which is depicted as a particular UL ACK ID 46 of the available cyclic shifts 48. In the exemplary implementation, six of twelve frequency resources are utilized and three time resources are utilized, providing eighteen UL ACK IDs 46. In the exemplary implementation a Zadoff-Chu (ZC) sequence is used, although it should be appreciated with the benefit of the present disclosure that other sequences can be used.

In selecting an approach for multiple access for ACK under an orthogonal ARQ system, first consider a ZC sequence of natural length N and base sequence parameter λ as shown below:

$$x_\lambda(k) = e^{-j\pi\lambda \cdot k^2/N} \text{ wherein } (\lambda, N) = 1$$

We define a cyclically shifted sequence as follows:

$$x_\lambda(k,a) = x_\lambda((k+a) \bmod N) \quad 0 \leq a \leq N-1$$

The input signal to IFFT from each UE is:

$$y_i(n,k) = s(n) \cdot x_\lambda(k, a_i(n))$$

wherein
  n=LFDM symbol index
  k=Tone index
  $a_i(n)$=Time varying cyclic shift for user i
  s(n)=ACK modulation symbol Therefore, for each localized frequency division multiplexing (LFDM) symbol index, user i modulates a different cyclic shift of the base ZC sequence. Such a ZC sequence hopping approach ensures that adjacent cell interference is randomized on the control channels.

With the benefit of the present disclosure, it should be appreciated that there are several ways of mapping the uplink (UL) acknowledgement (ACK) ID to a downlink (DL) allocation.

(1) Implicit Mapping from DL VRB. In this structure, there is an implicit one-to-one mapping from DL virtual resource block (VRB) index (i.e., DL allocation) to UL ACK location in frequency and time-varying cyclic shift. Consider an illustrative example in which there are m cyclic shifts of ZC sequences defined per UL resource block (RB).

$$i = b \cdot m + k$$

$$k = \{0, 1, \ldots, m-1\}$$

$$i = DL\ VRB \text{ index}$$
$$= \{0, 1, \ldots, N_{VRB} - 1\}$$

$$b = UL\ ACK\ RB \text{ index}$$
$$= \{0, 1, \ldots, (N_{VRB}/m) - 1\}$$

Then, we define:
DL VRB index i ⇔ UL ACK RB index b (FDM)
  ⇔ Cyclic shift a (n) on LFDM symbol index n (CDM)

$$b = \lfloor i/m \rfloor$$

$$a_i(n) = y_j((i+n) \bmod m)$$

j=Cell index
  $y_j(n)$=Cell specific hopping pattern

If a UE has been allocated more than one virtual resource block (VRB), the UE uses the ACK ID that corresponds to the first VRB index. This scales the ACK overhead appropriately, if the minimum allocation in the system is more than 1 VRB.

Therefore, a generalized structure is:
$N_{min}$=Minimum allocation $$b = \{0, 1, \ldots, (N_{VRB}/(N_{min} \cdot m)) - 1\}$$

DL VRB index i ⇔ UL ACK RB index b (FDM)
  ⇔ Cyclic shift $a_i(n)$ on LFDM symbol index n (CDM)

$$b = \lfloor i/(N_{min} \cdot m) \rfloor$$

The minimum allocation is signaled by the network and is applicable for all UEs. The network can control the UL ACK overhead by increasing or decreasing the minimum allocation.

(2) Implicit Mapping from DL PDCCH. In this structure, there is an implicit one-to-one mapping from DL PDCCH index to UL ACK location in frequency and time varying cyclic shift. This structure tries to minimize the UL ACK overhead, but increases the DL PDCCH overhead since theoretically every packet would need to be scheduled. Further, there are some severe drawbacks when one considers the scheduling modes being proposed for real-time services: (a) Persistent scheduling: With persistent scheduling or scheduling without PDCCH, the UL ACK location is undefined; and (b) Grouped PDCCH: If the DL PDCCH is intended to a group of UEs, the UL ACK is no longer orthogonal.

(3) Implicit Mapping from DL VRB and DL PDCCH is a hybrid mode of implicit mapping operation with semi-static partitioning of UL ACK resources. A Resource A is intended for No PDCCH allocated (i.e., Persistent Scheduling) or Grouped PDCCH. In addition, UL ACK ID is an implicit function of DL VRB ID, as discussed above at (1). A Resource B is intended for Unicast PDCCH allocated (i.e., Dynamic Scheduling). UL ACK ID is an implicit function of DL PDCCH ID, as also discussed above at (2). Due to a semi-static partitioning of resources, this approach does not completely resolve the issues, especially in a mixed service scenario.

(4) Explicit Mapping from DL PDSCH is transmitted in-band the UL ACK location with DL PDSCH. The UL ACK ID requires 3-bits to 7-bits, depending on the system bandwidth. Therefore, the signaling overhead is very small. Such a structure implies that OOK signaling should be used on UL ACK. In particular, ACK is mapped to "+1" and NAK is mapped to "0". This structure has complete flexibility. However, it does not allow the eNode B to distinguish between PDCCH errors and PDSCH errors. In this sense, it is more suited for PDCCH-less operation or persistent scheduling.

(5) Explicit and Implicit Mapping from DL PDSCH and PDCCH is a hybrid mode of explicit and implicit operation with dynamic partitioning of UL ACK resources. A Resource A is intended for No PDCCH allocated (i.e., Persistent Scheduling) and Grouped PDCCH. UL ACK ID is explicitly signaled in DL PDSCH, as discussed above at (4). A Resource B is intended for Unicast PDCCH allocated (i.e., Dynamic Scheduling). UL ACK ID is an implicit function of DL PDCCH ID, as discussed above at (2).

Figure 2:
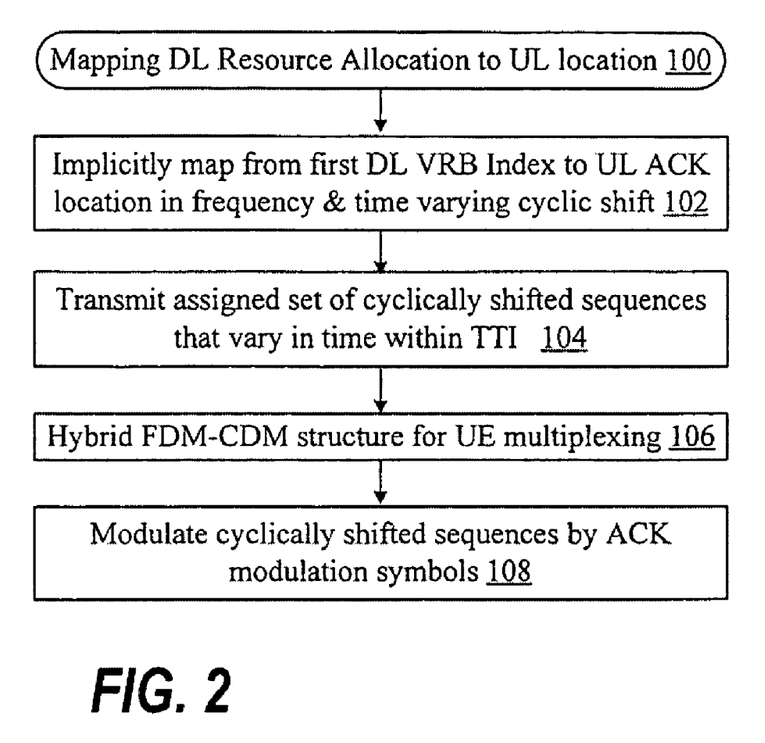
FIG. 2 illustrates a flow diagram of a methodology for implicitly mapping based on DL virtual resource block (VRB) for dynamically scheduled UEs.

In FIG. 2, a methodology 100 for mapping DL allocation to UL location implicitly maps from a first DL VRB index to an UL ACK location (index) in frequency and time varying cyclic shift in block (block 102). If more than one resource block is allocated, the eNode B can reassign these resources, such as through explicit scheduling to a persistently scheduled LE, if the communication system supports such multiple communication types. The UE can then transmit the assigned set of cyclically shifted Zadoff-Chu (ZC) sequences that vary in time within the transmission time interval (TTI) (block 104). The UL ACK ID is sent with UE multiplexing under a hybrid frequency division multiplexing (FDM)—code division multiplexing (CDM) structure (block 106). The ZC sequences are modulated in accordance to the ACK modulation symbols (block 108).

With the benefit of the present disclosure, it should be appreciated that implicit mapping from DL VRB is the simplest structure. ACK overhead reduction is achieved by signaling minimum allocation appropriately. Hybrid explicit and implicit operation is the most flexible, allowing for dynamic reuse of ACK resources.

The UL throughput difference (i.e., reuse of UL ACK resources) between DL VRB based implicit mapping and with hybrid explicit and implicit operation in mixed service scenarios has certain advantages that may be desirable in certain instances.

In summary, implicit mapping between DL VRB allocation and UL ACK ID can serve as a desirable baseline in an exemplary implementation. Multiple access among different ACKs can be realized with hybrid frequency division multiplexing (FDM) and code division multiplexing (CDM) structure for UE multiplexing. Each UE is assigned a set of cyclically shifted ZC sequences, which varies in time within the TTI and is equivalent to ZC sequence hopping. The varying of time of the ZC sequences are modulated by ACK modulation symbols.

Figure 3:
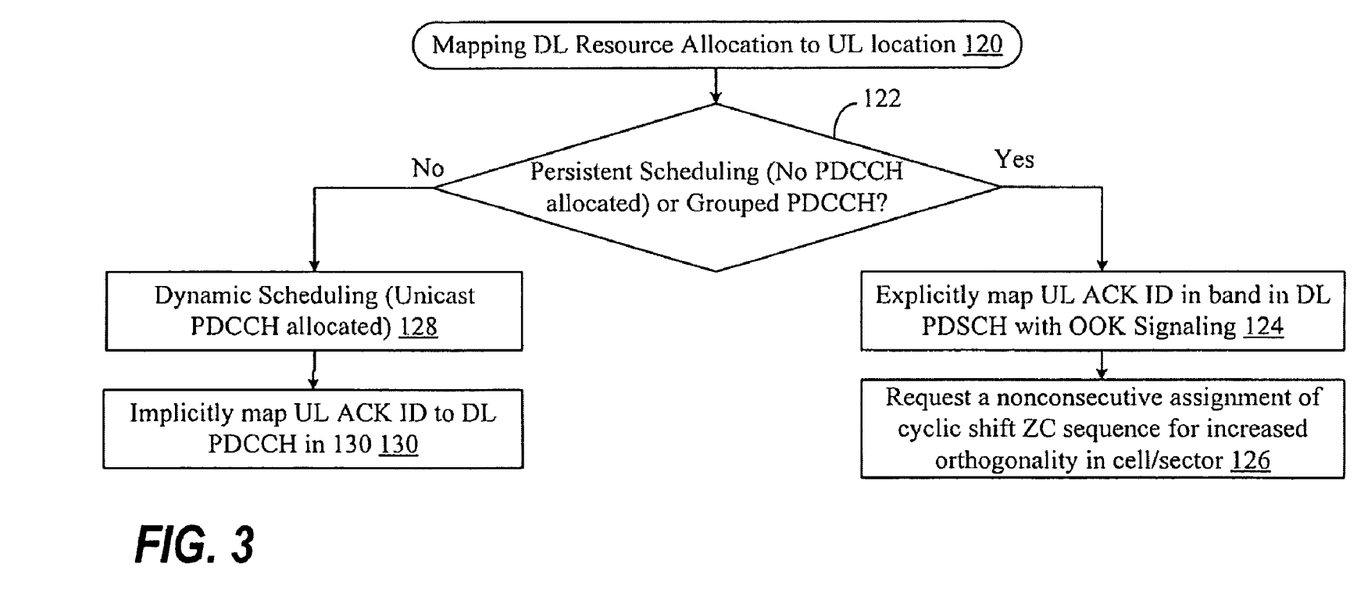
FIG. 3 illustrates a flow diagram of a methodology for implicitly mapping UL ACK ID for dynamically scheduled UEs and explicitly mapping for persistently scheduled UEs.

In FIG. 3, a methodology 120 for mapping UL ACK ID based upon a mode of scheduling by an access node. If a determination is made that persistent scheduling is to be made that is not PDCCH allocated, nor is the allocation pertaining to a grouped PDCCH (block 122), then the mapping of the UL ACK ID is made explicitly in-band in the DL PDSCH with On-Off Keying (block 124). The access terminal can request a nonsequential portion of the available cyclic shift ZC sequences in order to enhance orthogonality due to other access nodes/communication paths present in that sector or cell (block 126). If the determination in block 122 was negative, then dynamic scheduling (i.e., unicast PDCCH allocated) is the case (block 128) and mapping is done implicitly for the UL ACK ID based upon the resource allocation made by the PDCCH (block 130).

Figure 4:
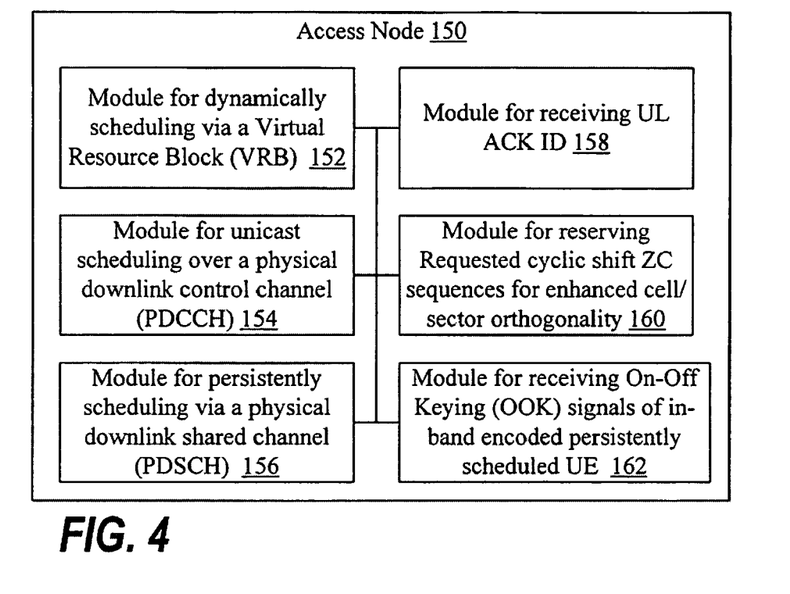
FIG. 4 illustrates a block diagram of an access node having modules for performing dynamic and persistent scheduling of access terminals in order to implicitly and explicitly map corresponding UL ACK ID responses.

In FIG. 4, in yet another aspect, an access node 150 can reduce the overhead involved in locating an UL ACK ID responsive to DL resource allocation by having a module 152 for dynamically scheduling via a virtual resource block (VRB). A module 154 provides for unicast scheduling over a physical downlink control channel (PDCCH). A module 156 provides for persistently scheduling via a physical downlink shared channel (PDSCH). A module 158 provides for receiving the multiplexed UL ACK IDs. A module 160 provides for reserving requested cyclic shift ZC sequences for enhanced cell/sector orthogonality. A module 162 provides for receiving On-Off Keying (OOK) by access terminals in response to in-band encoded persistently scheduling.

Figure 5:
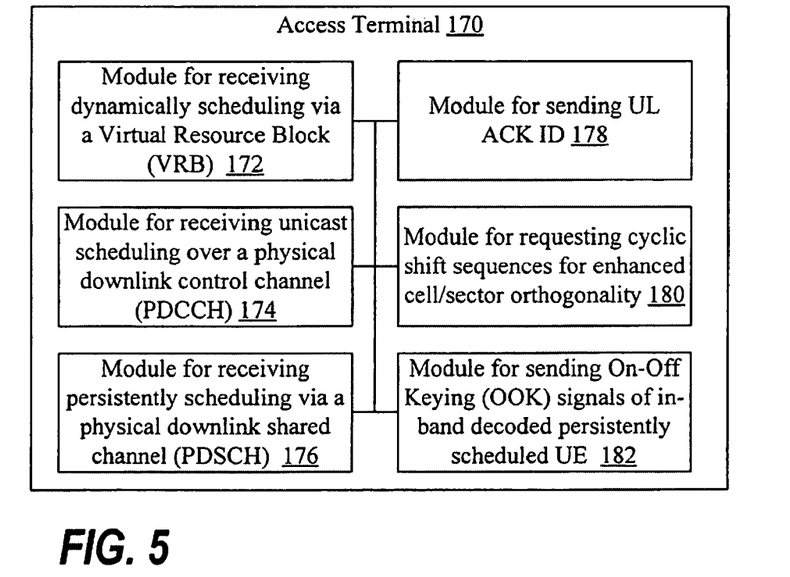
FIG. 5 illustrates a block diagram of an access terminal having modules for receiving dynamic and persistent scheduling from an access node and responding by implicitly or explicitly mapping a corresponding UL ACK ID response.

In FIG. 5, in yet a further aspect, an access terminal 170 can participate in reduced overhead involved in mapping an UL ACK ID responsive to DL resource allocation by having a module 172 for receiving dynamically scheduling via a virtual resource block (VRB). A module 174 provides for receiving unicast scheduling over a physical downlink control channel (PDCCH). A module 176 provides for receiving persistently scheduling via a physical downlink shared channel (PDSCH). A module 178 provides for sending the UL ACK ID in accordance with the mapping. A module 180 provides for requesting cyclic shift ZC sequences for enhanced cell/sector orthogonality. A module 182 provides for sending On-Off Keying (OOK) by access terminals in response to in-band decoded persistently scheduling.

Figure 6:
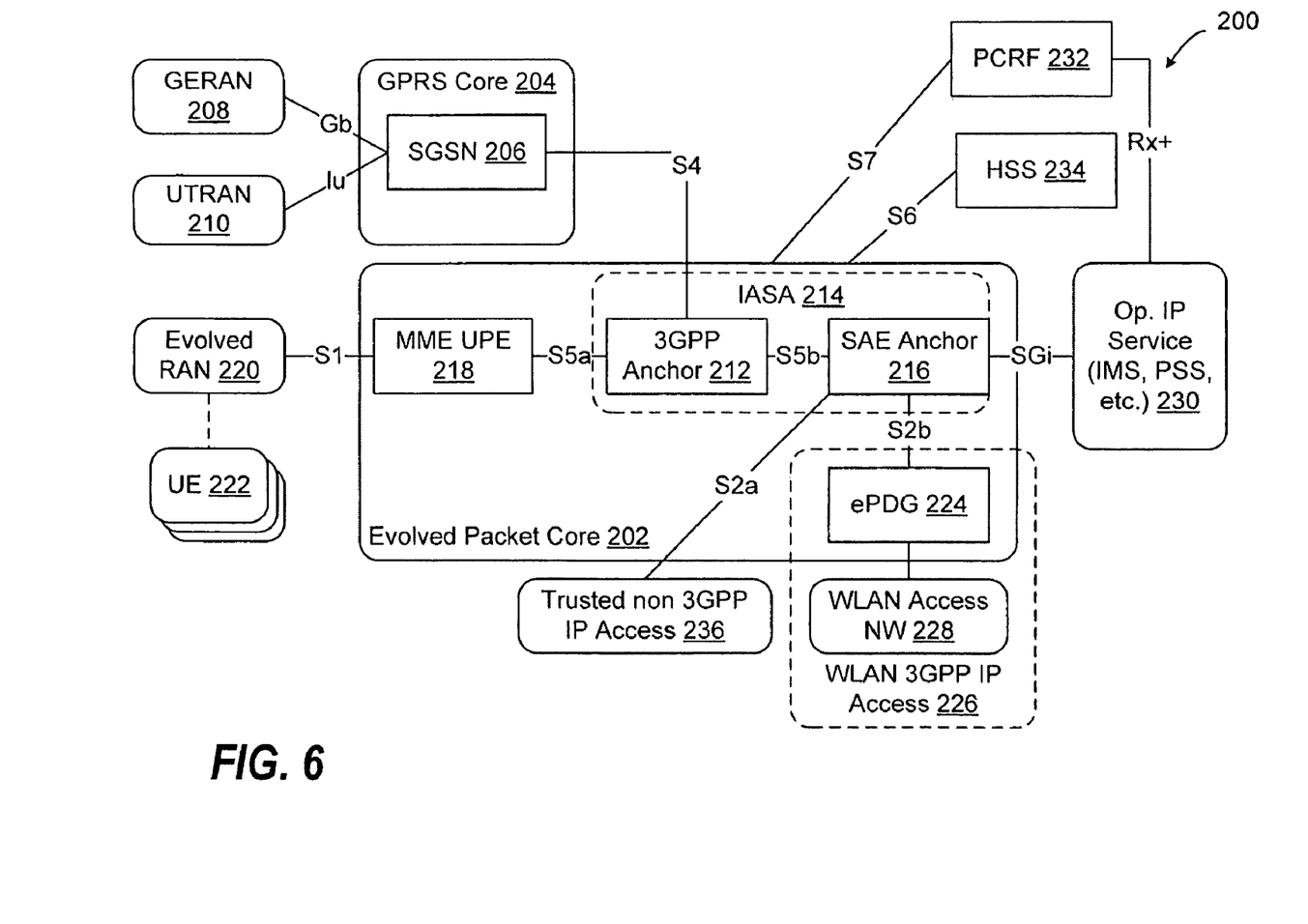
FIG. 6 illustrates a diagram of a communication system incorporating a legacy General Packet Radio Service (GPRS) core and an evolved packet core supporting reduced overhead for UL ACK ID mapping.

In FIG. 6, in another aspect, a communication system 200 that can encompass the communication system 10 of FIG. 1 includes support for interfacing an evolved packet core 202 via an interface S4 with a legacy General Packet Radio Service (GPRS) core 204, whose Serving GPRS Support Node (SGSN) 206 is interfaced in turn by a Gb interface to a Global System for Mobile Communications (GSM)/Edge Radio Access Network (GERAN) 208 and via an Iu interface to a UTRAN 210. The S4 provides the user plane with related control and mobility support between GPRS Core 204 and a 3GPP Anchor 212 of an Inter Access Stratum Anchor (IASA) 214 and is based on a Gn reference point as defined between SGSN 206 and Gateway GPRS Serving/Support Node (GGSN) (not shown). The IASA 214 also includes an system architecture evolved (SAE) anchor 216 interfaced to the 3GPP anchor 212 by an S5b interface that provides the user plane with related control and mobility support. The 3GPP anchor 212 communicates with an MME UPE 218 via interface S5a. Mobility Management entity (MME) pertains to distribution of paging messages to the eNBs and User Plane Entity (UPE) pertains to IP header compression and encryption of user data streams, termination of U-plane packets for paging reasons, and switching of U-plane for support of UE mobility. The MME UPE 218 communicates via interface S1 to an evolved RAN 220 for wirelessly communicating with UE devices 222.

An S2b interface provides the user plane with related control and mobility support between the SAE Anchor 216 and an evolved Packet Data Gateway (ePDG) 224 of a wireless local access network (WLAN) 3GPP IP Access component 226 that also includes a WLAN Access network (NW) 228. An SGi interface is the reference point between the Inter AS Anchor 216 and a packet data network 230. Packet data network 230 may be an operator external public or private packet data network or an intra operator packet data network, e.g. for provision of IP Multimedia Subsystem (IMS) services. This SGi reference point corresponds to Gi and Wi functionalities and supports any 3GPP and non-3GPP access systems. An Rx+ interface provides communication between the packet data network 230 and a policy and charging rules function (PCRF) 232, which in turn communicates via an S7 interface to the evolved packet core 202. The S7 interface provides transfer of (QoS) policy and charging rules from PCRF 232 to Policy and Charging Enforcement Point (PCEP) (not shown). An S6 interface (i.e., AAA interface) enables transfer of subscription and authentication data for authenticating/authorizing user access by interfacing the evolved packet core 202 to a home subscriber service (HSS) 234. An S2a interface provides the user plane with related control and mobility support between a trusted non 3GPP IP access 236 and the SAE Anchor 216.

It should be appreciated that wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Figure 7:
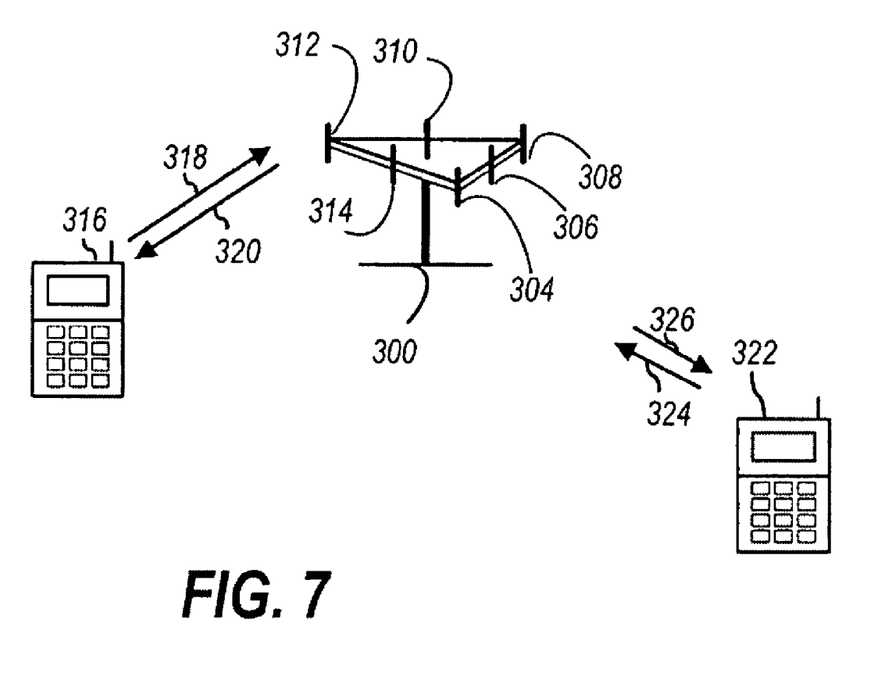
FIG. 7 illustrates a diagram of a multiple access wireless communication system according to one aspect for UL ACK ID mapping.

Referring to FIG. 7, a multiple access wireless communication system according to one aspect is illustrated. An access point 300 (AP) includes multiple antenna groups, one including 304 and 306, another including 308 and 310, and an additional including 312 and 314. In FIG. 7, only two antennas are shown for each antenna group, however, more or fewer antennas may be utilized for each antenna group. Access terminal 316 (AT) is in communication with antennas 312 and 314, where antennas 312 and 314 transmit information to access terminal 316 over forward link 320 and receive information from access terminal 316 over reverse link 318. Access terminal 322 is in communication with antennas 306 and 308, where antennas 306 and 308 transmit information to access terminal 322 over forward link 326 and receive information from access terminal 322 over reverse link 324. In a FDD system, communication links 318, 320, 324 and 326 may use different frequency for communication. For example, forward link 320 may use a different frequency then that used by reverse link 318.

Each group of antennas and/or the area in which they are designed to communicate is often referred to as a sector of the access point. In the aspect, antenna groups each are designed to communicate to access terminals in a sector, of the areas covered by access point 300.

In communication over forward links 320 and 326, the transmitting antennas of access point 300 utilize beamforming in order to improve the signal-to-noise ratio of forward links for the different access terminals 316 and 324. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 8:
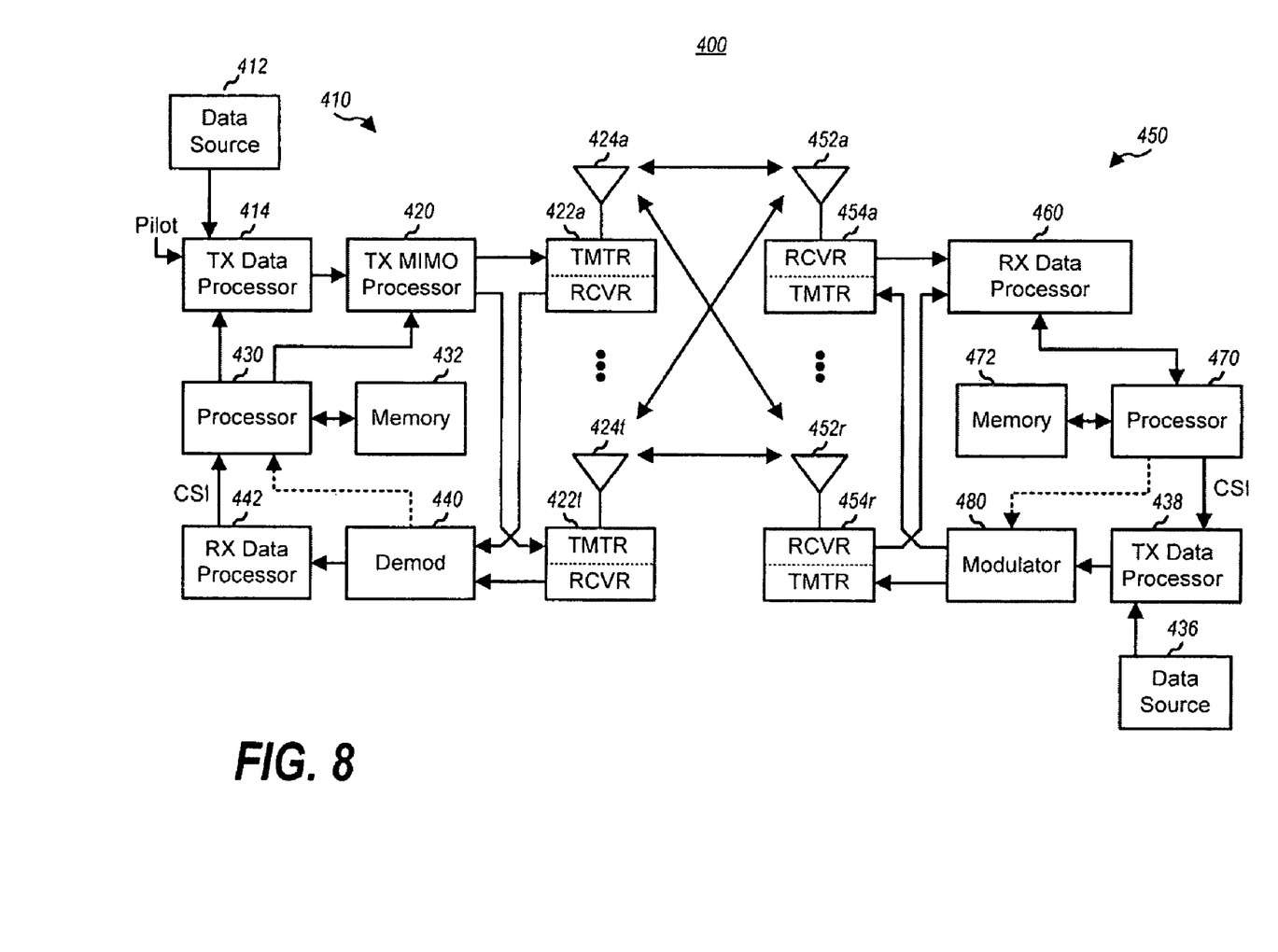
FIG. 8 illustrates a schematic block diagram of a communication system for supporting UL ACK ID mapping.

FIG. 8 is a block diagram of an aspect of a transmitter system 410 (also known as the access point) and a receiver system 450 (also known as access terminal) in a MIMO system 400. At the transmitter system 410, traffic data for a number of data streams is provided from a data source 412 to a transmit (TX) data processor 414.

In an aspect, each data stream is transmitted over a respective transmit antenna. TX data processor 414 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 430.

The modulation symbols for all data streams are then provided to a TX MIMO processor 420, which may further process the modulation symbols (e.g., for OFDM). TX MIMO processor 420 then provides $N_T$ modulation symbol streams to $N_T$ transmitters (TMTR) 422a through 422t. In certain implementations, TX MIMO processor 420 applies beamforming weights to the symbols of the data streams and to the antenna from which the symbol is being transmitted.

Each transmitter 422 receives and processes a respective symbol stream to provide one or more analog signals, and further conditions (e.g., amplifies, filters, and upconverts) the analog: signals to provide a modulated signal suitable for transmission over the MIMO channel. $N_T$ modulated signals from transmitters 422a through 422t are then transmitted from $N_T$ antennas 424a through 424t, respectively.

At receiver system 450, the transmitted modulated signals are received by $N_R$ antennas 452a through 452r and the received signal from each antenna 452 is provided to a respective receiver (RCVR) 454a through 454r. Each receiver 454 conditions (e.g., filters, amplifies, and downconverts) a respective received signal, digitizes the conditioned signal to provide samples, and further processes the samples to provide a corresponding "received" symbol stream.

An RX data processor 460 then receives and processes the $N_R$ received symbol streams from $N_R$ receivers 454 based on a particular receiver processing technique to provide $N_T$ "detected" symbol streams. The RX data processor 460 then demodulates, deinterleaves, and decodes each detected symbol stream to recover the traffic data for the data stream. The processing by RX data processor 460 is complementary to that performed by TX MIMO processor 420 and TX data processor 414 at transmitter system 410.

A processor 470 periodically determines which pre-coding matrix to use (discussed below). Processor 470 formulates a reverse link message comprising a matrix index portion and a rank value portion.

The reverse link message may comprise various types of information regarding the communication link and/or the received data stream. The reverse link message is then processed by a TX data processor 438, which also receives traffic data for a number of data streams from a data source 436, modulated by a modulator 480, conditioned by transmitters 454a through 454r, and transmitted back to transmitter system 410.

At transmitter system 410, the modulated signals from receiver system 450 are received by antennas 424, conditioned by receivers 422, demodulated by a demodulator 440, and processed by a RX data processor 442 to extract the reserve link message transmitted by the receiver system 450. Processor 430 then determines which pre-coding matrix to use for determining the beamforming weights then processes the extracted message.

In an aspect, logical channels are classified into Control Channels and Traffic Channels. Logical Control Channels comprises Broadcast Control Channel (BCCH), which is DL channel for broadcasting system control information. Paging Control Channel (PCCH), which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH), which is Point-to-point bi-directional channel, dedicated to one UE, for the transfer of user information. In addition, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging-Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and plurality of PHY channels. The PHY channels comprise a set of DL channels and UL channels.

The DL PHY channels comprises: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); Load Indicator Channel (LICH); The UL PHY Channels comprises: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); Broadband Pilot Channel (BPICH).

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description or of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the evolved RAN (e.g., access point, eNode B) can infer or predict data traffic conditions and opportunities for flexible DTX-DRX and make determinations of an implicit relinquishing of CQI resources by a UE device based on previous interactions with the same or like machines under similar conditions.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method implemented in an apparatus for wireless communication, comprising:
   dynamically scheduling a user equipment (UE) with a resource allocation of at least one downlink (DL) virtual resource block (VRB); and
   determining an uplink (UL) acknowledgement (ACK) Identifier (ID) for the UE based on the at least one DL VRB, the UL ACK ID being associated with a time-varying cyclic shift of a base sequence.

2. The method of claim 1, wherein the resource allocation for the UE comprises a plurality of DL VRBs implicitly mapped to one UL ACK ID.

3. A method implemented in an apparatus for wireless communication, comprising:
   persistently scheduling a user equipment (UE) without sending a resource allocation on a Physical Downlink Control Channel (PDCCH) for each data transmission covered by the persistent scheduling; and
   explicitly signaling an uplink (UL) acknowledgement (ACK) identifier (ID) for the UE, the UL ACK ID being used by the UE to send ACK information for data transmissions covered by the persistent scheduling.

4. The method of claim 3, further comprising:
   receiving ACK information sent by the UE based on resources associated with the UL ACK ID.

5. The method of claim 3, further comprising:
   dynamically scheduling the UE with a resource allocation sent on the PDCCH; and
   determining a second UL ACK ID implicitly mapped to the PDCCH.

6. The method of claim 3, wherein the explicitly signaling comprises sending information indicative of the UL ACK ID for the UE in a Physical Downlink Shared Channel (PDSCH).

7. The method of claim 3, wherein the UL ACK ID is associated with at least one frequency resource, or at least one time resource, or at least one code resource, or at least one cyclic shift of a base sequence, or a combination thereof, for sending ACK information.

8. The method of claim 7, wherein the base sequence comprises a Zadoff-Chu sequence.

9. A processor for wireless communication, comprising:
   a first module for dynamically scheduling a user equipment (UE) with a resource allocation of at least one downlink (DL) virtual resource block (VRB); and
   a second module for determining an uplink (UL) acknowledgement (ACK) Identifier (ID) for the UE based on the at least one DL VRB, the UL ACK ID being associated with a time-varying cyclic shift of a base sequence.

10. A computer program product for wireless communication, comprising:
    a non-transitory computer-readable medium, comprising:
    a first set of codes for causing a computer to dynamically schedule a user equipment (UE) with a resource allocation of at least one downlink (DL) virtual resource block (VRB); and
    a second set of codes for causing the computer to determine an uplink (UL) acknowledgement (ACK) Identifier (ID) for the UE based on the at least one DL VRB, the UL ACK ID being associated with a time-varying cyclic shift of a base sequence.

11. An apparatus for wireless communication, comprising:
    means for dynamically scheduling a user equipment (UE) with a resource allocation of at least one downlink (DL) virtual resource block (VRB); and
    means for determining an uplink (UL) acknowledgement (ACK) Identifier (ID) for the UE based on the at least one DL VRB, the UL ACK ID being associated with a time-varying cyclic shift of a base sequence.

12. An apparatus for wireless communication, comprising:
    a scheduling component for dynamically scheduling a user equipment (UE) with a resource allocation of at least one downlink (DL) virtual resource block (VRB); and
    a determination component for determining an uplink (UL) acknowledgement (ACK) Identifier (ID) for the UE based on the at least one DL VRB, the UL ACK ID being associated with a time-varying cyclic shift of a base sequence.

13. The apparatus of claim 12, wherein the resource allocation for the UE comprises a plurality of DL VRBs implicitly mapped to one UL ACK ID.

14. An apparatus for wireless communication, comprising:
    a scheduling component for persistently scheduling a user equipment (UE) without sending a resource allocation on a Physical Downlink Control Channel (PDCCH) for each data transmission covered by the persistent scheduling; and
    a transmission component for explicitly signaling an uplink (UL) acknowledgement (ACK) identifier (ID) for the UE, the UL ACK ID being used by the UE to send ACK information for data transmissions covered by the persistent scheduling.

15. The apparatus of claim 14, further comprising:
    a receiving component for receiving ACK information sent by the UE based on resources associated with the UL ACK ID.

16. The apparatus of claim 14, the scheduling component dynamically scheduling the UE with a resource allocation sent on the PDCCH, and the apparatus further comprising:
    a determination component for determining a second UL ACK ID implicitly mapped to the PDCCH.

17. A method implemented in an apparatus for wireless communication, comprising:
    receiving a resource allocation of at least one downlink (DL) virtual resource block (VRB) from an access node to dynamically schedule a user equipment (UE) for data transmission; and determining an uplink (UL) acknowledgement (ACK) Identifier (ID) for the UE based on the at least one DL VRB, the UL ACK ID being associated with a time-varying cyclic shift of a base sequence.

18. The method of claim 17, wherein the resource allocation for the UE comprises a plurality of DL VRBs implicitly mapped to one UL ACK ID.

19. A method implemented in an apparatus for wireless communication, comprising:
receiving persistent scheduling for a user equipment (UE) without receiving a resource allocation on a Physical Downlink Control Channel (PDCCH) for each data transmission covered by the persistent scheduling; and
receiving explicit signaling of an uplink (UL) acknowledgement (ACK) identifier (ID) for the UE, the UL ACK ID being used by the UE to send ACK information for data transmissions covered by the persistent scheduling.

20. The method of claim 19, further comprising:
sending ACK information by the UE based on resources associated with the UL ACK ID.

21. The method of claim 19, further comprising:
receiving a resource allocation sent on the PDCCH to dynamically schedule the UE; and
determining a second UL ACK ID implicitly mapped to the PDCCH.

22. The method of claim 19, wherein the receiving explicit signaling comprises receiving explicit signaling indicative of the UL ACK ID for the UE in a Physical Downlink Shared Channel (PDSCH).

23. The method of claim 19, wherein the UL ACK ID is associated with at least one frequency resource, or at least one time resource, or at least one code resource, or at least one cyclic shift of a base sequence, or a combination thereof, for sending ACK information.

24. The method of claim 23, wherein the base sequence comprises a Zadoff-Chu sequence.

25. A processor for wireless communication, comprising:
a first module for receiving a resource allocation of at least one downlink (DL) virtual resource block (VRB) from an access node to dynamically schedule a user equipment (UE) for data transmission; and
a second module for determining an uplink (UL) acknowledgement (ACK) Identifier (ID) for the UE based on the at least one DL VRB, the UL ACK ID being associated with a time-varying cyclic shift of a base sequence.

26. A computer program product for wireless communication, comprising:
a non-transitory computer-readable medium, comprising:
a first set of codes for causing a computer to receive a resource allocation of at least one downlink (DL) virtual resource block (VRB) from an access node to dynamically schedule a user equipment (UE) for data transmission; and
a second set of codes for causing the computer to determine an uplink (UL) acknowledgement (ACK) Identifier (ID) for the UE based on the at least one DL VRB, the UL ACK ID being associated with a time-varying cyclic shift of a base sequence.

27. An apparatus for wireless communication, comprising:
means for receiving a resource allocation of at least one downlink (DL) virtual resource block (VRB) from an access node to dynamically schedule a user equipment (UE) for data transmission; and
means for determining an uplink (UL) acknowledgement (ACK) Identifier (ID) for the UE based on the at least one DL VRB, the UL ACK ID being associated with a time-varying cyclic shift of a base sequence.

28. An apparatus for wireless communication, comprising:
a first component for receiving a resource allocation of at least one downlink (DL) virtual resource block (VRB) from an access node to dynamically schedule a user equipment (UE) for data transmission; and
a second component for determining an uplink (UL) acknowledgement (ACK) Identifier (ID) for the UE based on the at least one DL VRB, the UL ACK ID being associated with a time-varying cyclic shift of a base sequence.

29. The apparatus of claim 28, wherein the resource allocation for the UE comprises a plurality of DL VRBs implicitly mapped to one UL ACK ID.

30. An apparatus for wireless communication, comprising:
a first component for receiving persistent scheduling for a user equipment (UE) without receiving a resource allocation on a Physical Downlink Control Channel (PDCCH) for each data transmission covered by the persistent scheduling; and
a second component for receiving explicit signaling of an uplink (UL) acknowledgement (ACK) identifier (ID) for the UE, the UL ACK ID being used by the UE to send ACK information for data transmissions covered by the persistent scheduling.

31. The apparatus of claim 30, further comprising:
a third component for sending ACK information by the UE based on resources associated with the UL ACK ID.

32. The apparatus of claim 30, the first component for receiving a resource allocation sent on the PDCCH to dynamically schedule the UE, and the second component for determining a second UL ACK ID implicitly mapped to the PDCCH.

33. An apparatus for wireless communication, comprising:
means for persistently scheduling a user equipment (UE) without sending a resource allocation on a Physical Downlink Control Channel (PDCCH) for each data transmission covered by the persistent scheduling; and
means for explicitly signaling an uplink (UL) acknowledgement (ACK) identifier (ID) for the UE, the UL ACK ID being used by the UE to send ACK information for data transmissions covered by the persistent scheduling.

34. The apparatus of claim 33, further comprising:
means for receiving ACK information sent by the UE based on resources associated with the UL ACK ID.

35. The apparatus of claim 33, further comprising:
means for dynamically scheduling the UE with a resource allocation sent on the PDCCH; and
means for determining a second UL ACK ID implicitly mapped to the PDCCH.

36. The apparatus of claim 33, wherein the means for explicitly signaling comprises means for sending information indicative of the UL ACK ID for the UE in a Physical Downlink Shared Channel (PDSCH).

37. The apparatus of claim 33, wherein the UL ACK ID is associated with at least one frequency resource, or at least one time resource, or at least one code resource, or at least one cyclic shift of a base sequence, or a combination thereof, for sending ACK information.

38. The apparatus of claim 37, wherein the base sequence comprises a Zadoff-Chu sequence.

39. An apparatus for wireless communication, comprising:
means for receiving persistent scheduling for a user equipment (UE) without receiving a resource allocation on a Physical Downlink Control Channel (PDCCH) for each data transmission covered by the persistent scheduling; and means for receiving explicit signaling of an uplink (UL) acknowledgement (ACK) identifier (ID) for the UE, the UL ACK ID being used by the UE to send ACK information for data transmissions covered by the persistent scheduling.

40. The apparatus of claim 39, further comprising:
means for sending ACK information by the UE based on resources associated with the UL ACK ID.

41. The apparatus of claim 39, further comprising:
means for receiving a resource allocation sent on the PDCCH to dynamically schedule the UE; and
means for determining a second UL ACK ID implicitly mapped to the PDCCH.

42. The apparatus of claim 39, wherein the means for receiving explicit signaling comprises means for receiving explicit signaling indicative of the UL ACK ID for the UE in a Physical Downlink Shared Channel (PDSCH).

43. The apparatus of claim 39, wherein the UL ACK ID is associated with at least one frequency resource, or at least one time resource, or at least one code resource, or at least one cyclic shift of a base sequence, or a combination thereof, for sending ACK information.

44. The apparatus of claim 43, wherein the base sequence comprises a Zadoff-Chu sequence.

* * * * *